May 8, 1951  G. D. HARRAH  2,552,483
STABILIZER FOR TRAILER BOGIES
Filed May 18, 1948  6 Sheets-Sheet 1

INVENTOR
GEORGE D HARRAH
BY
ATTYS.

May 8, 1951 G. D. HARRAH 2,552,483
STABILIZER FOR TRAILER BOGIES
Filed May 18, 1948 6 Sheets-Sheet 2

INVENTOR
GEORGE D. HARRAH
BY
ATTYS.

May 8, 1951  G. D. HARRAH  2,552,483
STABILIZER FOR TRAILER BOGIES
Filed May 18, 1948  6 Sheets-Sheet 3

INVENTOR
GEORGE D. HARRAH
BY
ATTYS.

May 8, 1951 G. D. HARRAH 2,552,483
STABILIZER FOR TRAILER BOGIES
Filed May 18, 1948 6 Sheets-Sheet 4

INVENTOR
GEORGE D. HARRAH
BY
ATTYS.

May 8, 1951 G. D. HARRAH 2,552,483
STABILIZER FOR TRAILER BOGIES
Filed May 18, 1948 6 Sheets-Sheet 5

INVENTOR
GEORGE D. HARRAH
BY
ATTYS.

May 8, 1951        G. D. HARRAH        2,552,483
STABILIZER FOR TRAILER BOGIES
Filed May 18, 1948        6 Sheets-Sheet 6
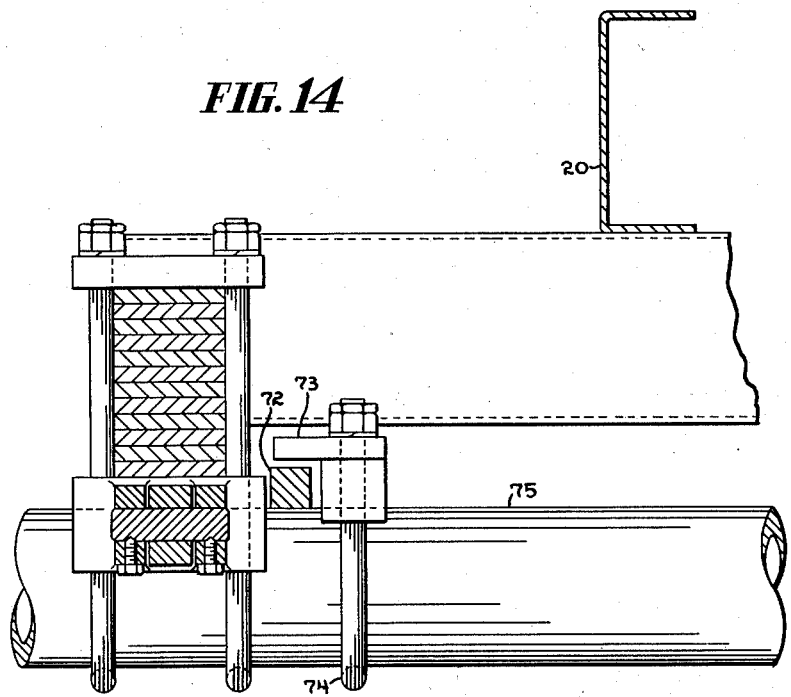
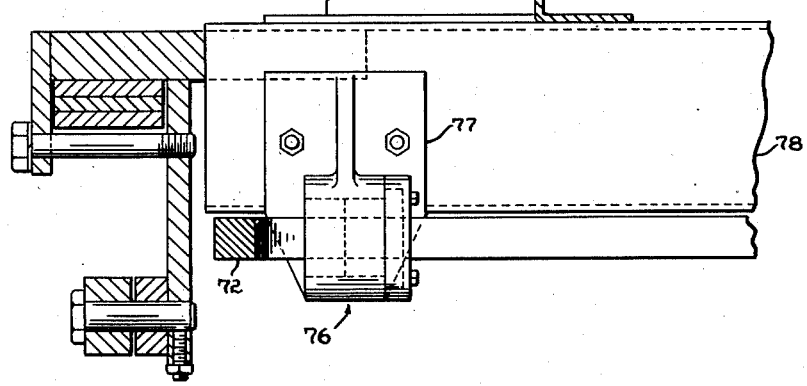
INVENTOR
GEORGE D. HARRAH
BY
ATTYS.

Patented May 8, 1951

2,552,483

UNITED STATES PATENT OFFICE 2,552,483

STABILIZER FOR TRAILER BOGIES

George D. Harrah, Canton, Ohio, assignor to The Oyler Motor Transit Company, Canton, Ohio, a corporation of Ohio Application May 18, 1948, Serial No. 27,687

5 Claims. (Cl. 280—81)

This invention relates to tractor-trailers and in particular to stabilizers therefor. In a copending application of Otto Oyler, Serial No. 669,183, filed May 11, 1946, now Patent No. 2,460,429, there is shown a trailer of the type here considered, having a dual set of rear bogies in tandem, interconnected by a set of reversely applied universal linkages, the linkages being the sole load-transmitting and draft medium for the rear bogie. In that application was shown a stabilizer shaft for the front one of the dual bogies. It is the purpose of this application to present such an organization in which both bogies are provided with stabilizers. Since, in this type of trailer the rear bogie is "free floating," provision is made for transmitting excessive side rocking to the rear bogie in order that its stabilizer may be brought into action to assist damping of the rocking of the trailer. This transmitting of rocking from one bogie to the other does not come into play in normal rocking of either. During normal rocking of the vehicle, only the front stabilizer is active with respect thereto, the rear stabilizer functioning solely in response to rocking of the rear bogie.

It is therefore an object of the invention to provide a tractor-trailer of the universally interconnected dual bogie type in which front and rear stabilizers are provided, a further object being to provide such a trailer and stabilizers wherein excessive rocking in either bogie automatically invokes the assistance of the stabilizer in the other for more effective damping action.

It is a further object to provide stabilizers of improved construction and ready application.

Still another object is to provide means for limiting relative rocking between dual bogies.

To these and other ends which will become apparent as the description proceeds, the invention in its best form known to me is set forth in the accompanying specification and illustrated in the drawings, in which.

Figure 3:
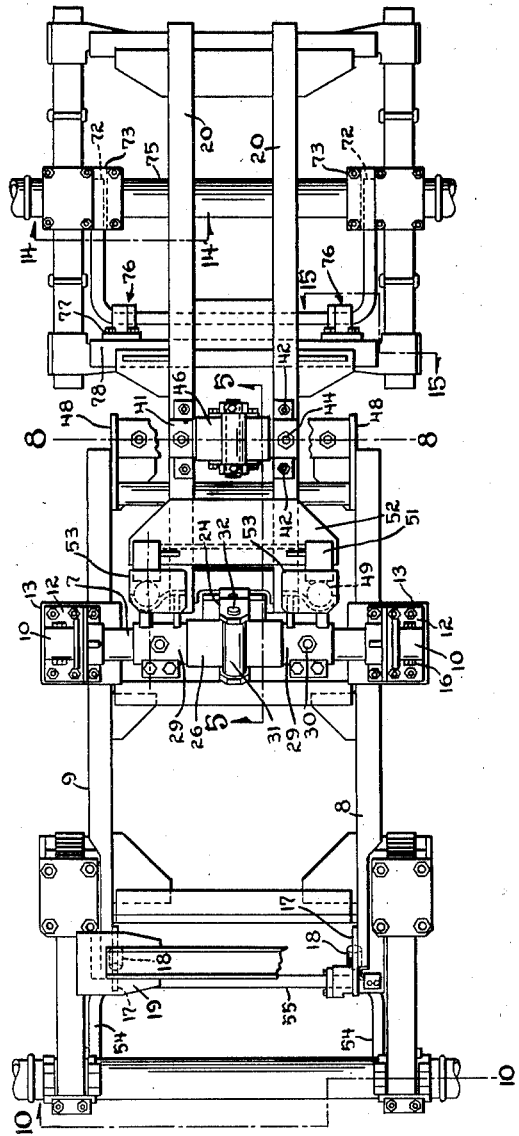
Fig. 3 is a top plan view of the rear dual bogies with wheels removed.
Figure 4:
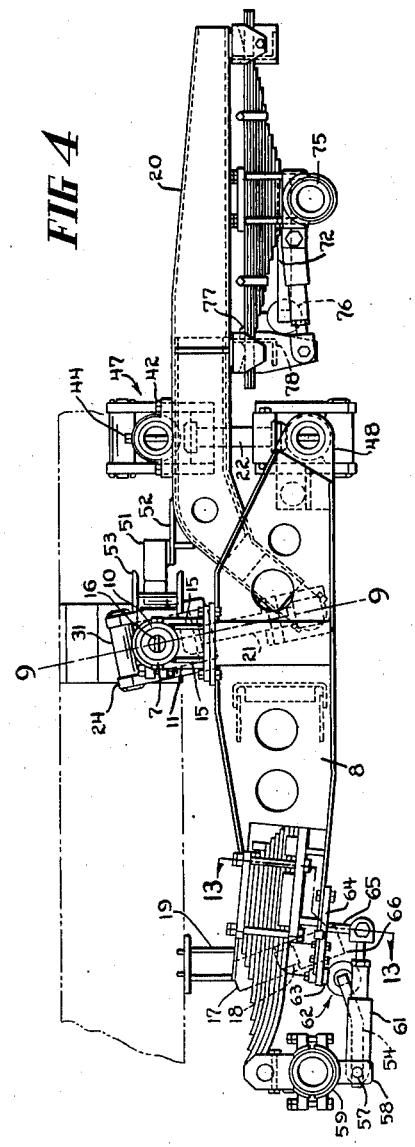
Fig. 4 is a side view of the parts shown in Fig. 3.
Figure 10:
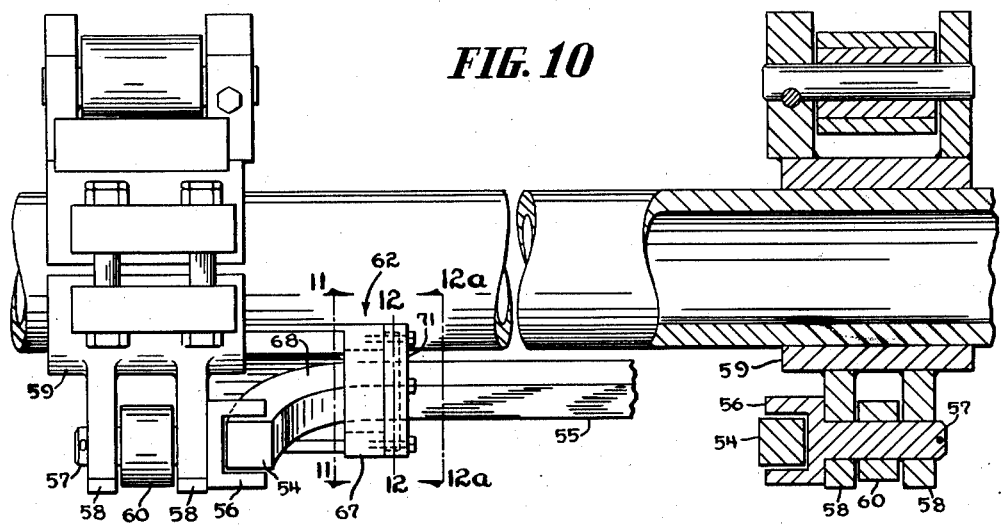
Fig. 10 is a partial sectional view taken along the line 10—10 of Fig. 3.
Figure 11:
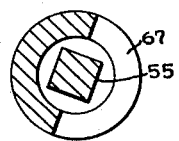
Figure 12:
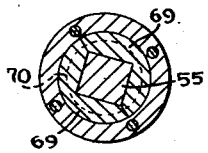
Figure 12A:
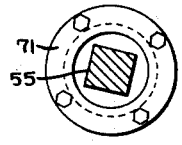
Figure 13:
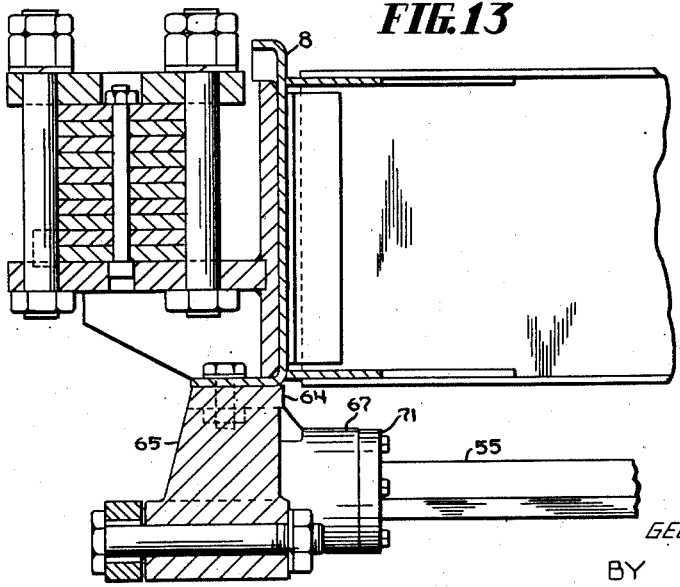

Figs. 11, 12 and 12a are sectional views taken along the lines 11—11, 12—12, and 12a—12a, respectively, of Fig. 10;

Fig. 13 is a section taken along the line 13—13 of Fig. 4;

Fig. 14 is a section taken along the line 14—14 of Fig. 3; and

Fig. 15 is a partial sectional view taken along the line 15—15 of Fig. 3.

The invention, as shown in this application, is embodied in a region lying between the front and rear wheels (full lines, Fig. 2) of the dual set of bogies.

Figure 1:
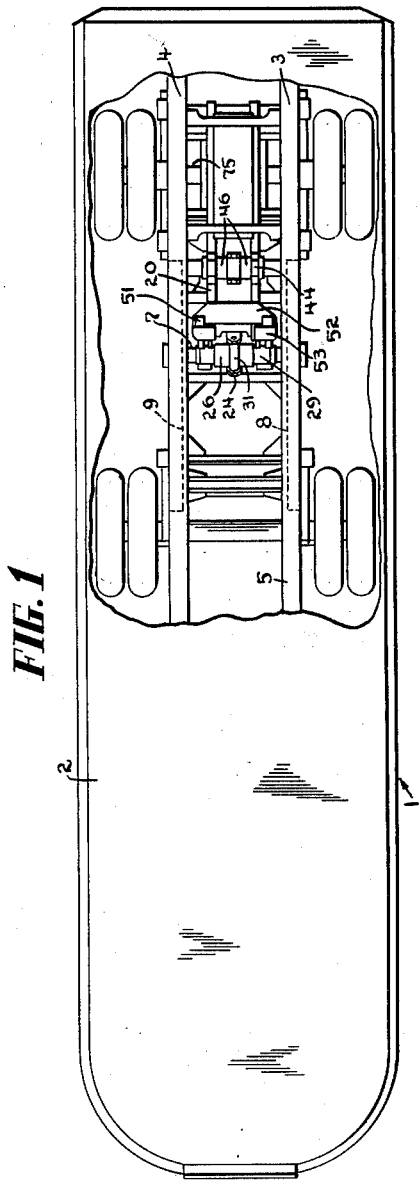
Fig. 1 is a top plan view of the floor of a trailer with parts broken away to show the supporting structure.
Figure 2:
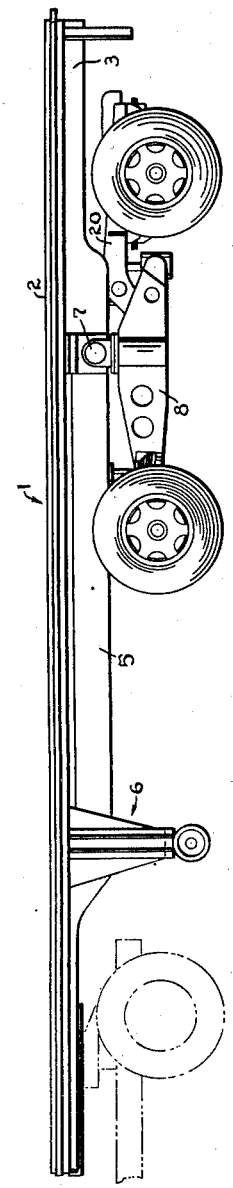
Fig. 2 is a side view of the trailer of Fig. 1.

Referring to Figs. 1 and 2, there is shown generally at 1 a trailer chassis having a floor 2. The chassis comprises two parallel girders 3, 4, each having a wide central span 5. A landing gear is shown generally at 6. Tractor wheels and fifth wheel connector are shown in phantom forwardly of the trailer chassis.

The front bogie

The entire load of the rear of the trailer is transmitted to the dual bogies through a main trunnion 7 supported in openings in the channel members 5 of the chassis frame. The front bogie, comprising a pair of channel beams 8, 9, is mounted on the main trunnion 7, for pitching movement thereabout, by means of a pair of collars such as 10 on an upright 11 carried by a base 12 bolted to a plate 13, which is welded to the channel 8, and having a backing member 14. Webs 15 lend strength and rigidity to the collar assembly. Collars 10 are fixed to the main trunnion as by pins 16 which may comprise headed bolts and nuts.

The only motion of the main frame 8 of the front bogie with respect to the trailer chassis is the pitching action about the main trunnion. This involves large amplitudes of swing of the front end of the bogie frame and provision is there made for taking up side thrust by means of a pair of plates 17 carried by the frame 8 and closely adjacent rollers 18 carried by a dependent bracket 19 fixed to the trailer chassis.

Before giving a detailed description of the bogies, it is desired to highlight the main structural features of each to afford an understanding of their broad, functional interrelation.

The rear bogie

The rear bogie, comprising main channel girders 20 and lying between the front bogie girders 8, 9, has a double articulation with the trailer vehicle as a whole. This comprises a universal connection to the main trunnion 7 and another universal connection to the rear of the front bogie frames 8, 9.

The universal connections comprise hanger members 21, 22, respectively with the result that the bobbing action of the rear bogie is not a simple uniaxial affair but a resultant of rocking about the rear of the front bogie at a radius determined by the hanger 22, and about the main trunnion at a radius determined by the hanger 21. The result is a very efficient distribution of bobbing or pitching action from one bogie to the other with consequent damping of the action and limiting of its amplitude, and a bogie assembly which permits independent pitching of the separate members within limits.

In addition, the universal connections permit free swinging of the rear bogie relative to the trailer chassis with the result that the rear wheels track perfectly on a curved course. Likewise the universals permit independent side rocking about a longitudinal axis in the rear bogie and the total result is not only a rear bogie which is "free floating" but also a bogie system in which each carries its assigned share of the trailer load at all times irrespective of momentary wheel positions while traversing abnormal terrain.

The universal bogie connections

Figure 5:
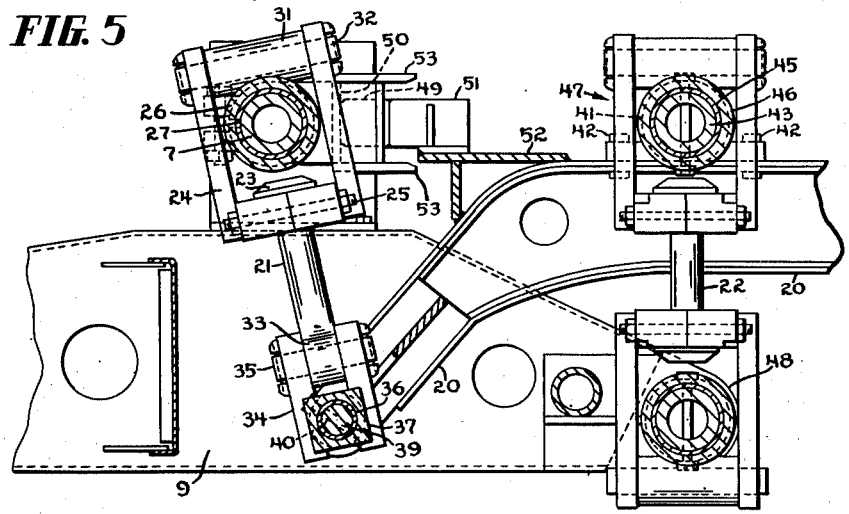
Fig. 5 is a section taken on the line 5—5 of Fig. 3.
Figure 6:
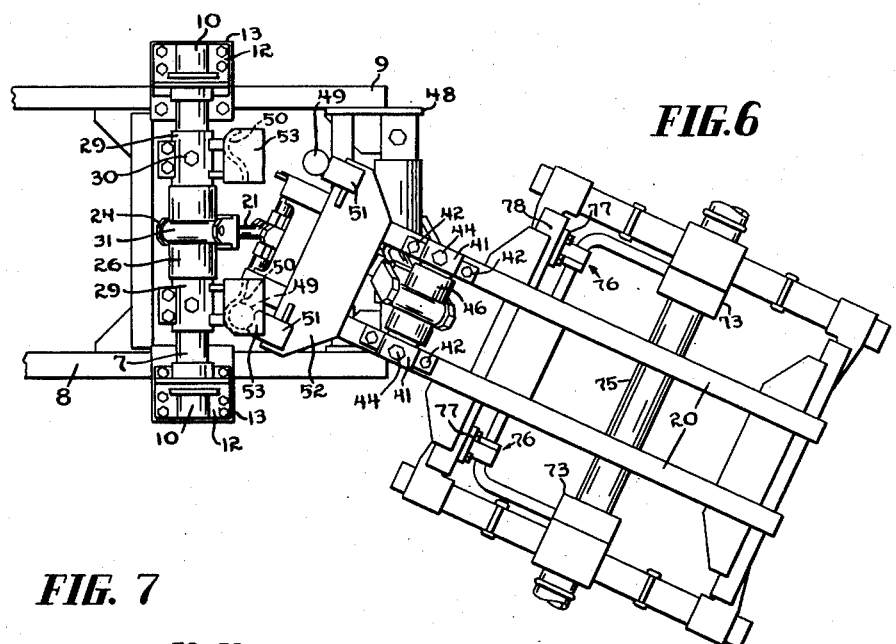
Fig. 6 is a partial view of the central portion of the bogies of Fig. 3, with the rear bogie swung aside.
Figure 7:
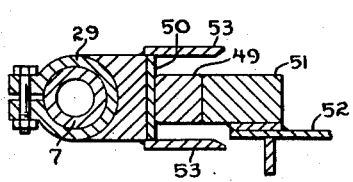
Fig. 7 is a section taken on the line 7—7 of Fig. 3.
Figure 8:
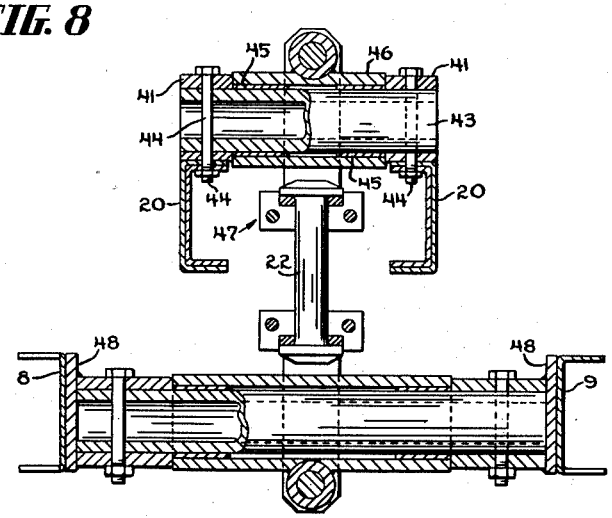
Fig. 8 is a section taken on the line 8—8 of Fig. 3.
Figure 9:
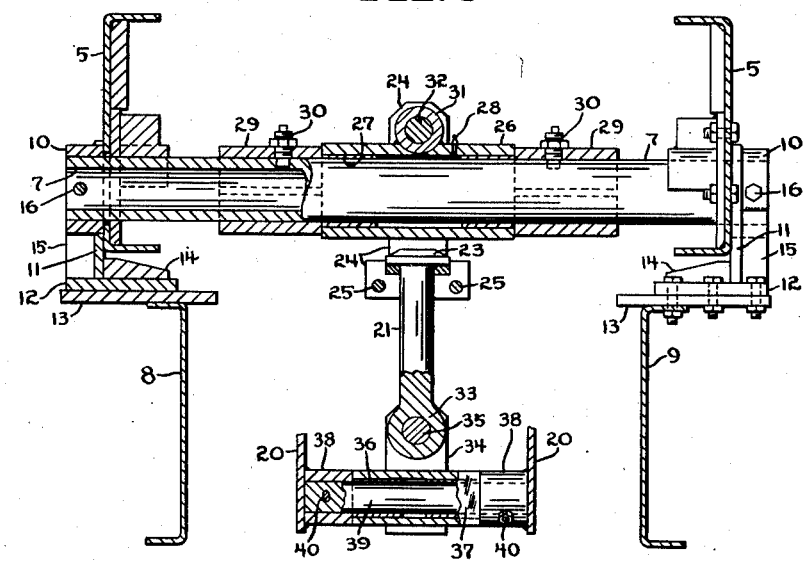
Fig. 9 is a section taken on the line 9—9 of Fig. 4.

The details of the universal connections are shown in Figs. 4 to 9 and particularly in Fig. 5. In the forward unit, the hanger 21 headed as at 23 depends from and is rotatable in a clevis 24 formed in two halves and secured around pin 21 by means of bolts 25. A bushing housing 26 having a bearing sleeve 27 with lubricant groove 28 is received on the main trunnion 7 and centered and secured against side thrust by sleeves 29, the latter being secured in place by pins 30 equipped with lock nuts. The top of the housing 26 has welded thereto a sleeve 31 to which the upper end of clevis 24 is secured by a bolt 32. The bottom of hanger 21 has an eye 33 and is secured to a clevis 34 of the rear bogie by a pin 35 for swinging motion about the pin. Thus, the universal action is defined by the axes of trunnion 7, hanger 21 and pin 35. The articulation of clevis 34 with the front end of the rear bogie is accomplished through a bushing sleeve 36 surrounding a shaft 39 and contained in a housing 37 of square section to which the clevis is fixed as by welding. Thrust-bearing and spacer sleeves 38 are carried by rear bogie girders 20 and are irrotatably fixed to shaft 39 by bolts 40. This completes the forward articulation.

The rear hanger 22 depends from a pivot assembly on the rear bogie, comprising a pair of bearing blocks 41 fixed to the bogie frames 20 through their flanges by bolts 42. A shaft 43 is received in the blocks 41 and is held against rotation and axial movement by bolts 44. A bearing sleeve 45 surrounds the central portion of the shaft 43 and receives an outer sleeve 46 which carries a clevis assembly, shown generally at 47, which is similar to the upper clevis assembly in the forward articulation. Downward of the hanger 22 the linkage is the same as that above except for dimensions and the fact that the bearing blocks are carried between channels 8, 9 of the front bogie, being welded to plates 48 which are in turn welded to the bogie frame.

The heel-and-toe action

The heel-and-toe action shown and claimed in the patent to Oyler, No. 2,252,135 is accomplished by cylindrical members 49 which engage in sockets 50, either together, or in one only of them when rounding a curve. The sockets 50 are carried by the thrust bearing sleeves 29 on the shaft 7, and the cylinders 49 are welded to extensions 51 on a plate 52 fixed to the frame of the rear bogie. Plates 53 above and below the sockets 50 and fixed thereto and to the sleeves 29 form a part of the stabilizer combination to be further described below.

The stabilizers

The front stabilizer may be viewed in Figs. 3 and 4 and is shown somewhat in detail in Figs. 10 to 12$^a$. It comprises a U-shaped member of square section having forwardly extending flexing arms 54 and a stationary cross member 55. The forward ends of the stabilizer engage in forked members 56 having reduced shanks 57 supported in lugs 58 on dead-axle bearings 59. The shanks 57 also serve to anchor the rear ends 60 of the radius rods 61.

My novel means for anchoring the transverse portion of the stabilizer comprises ring members in an assemblage shown generally at 62. As best shown in Figs. 4 and 13, these are fixed to the bogie frame 8 through plates 63 and 64 which are bolted to the frame. Plates 64 also carry the members 65 anchoring the rear ends of the radius rod and the entire assemblage is strengthened by a web 66.

Of the assemblage 62, ring 67 is a fixed part of the anchorage and has an internal diameter of sufficient size to permit passage of the stabilizer bar elbow 68 therethrough. The bar is then brought into keying contact with its anchorage by inserting the semi-circular plates 69 into the countersunk portion 70 of the member 67 and then bolting in place the locking ring 71. The square hole in the pair of members 69 affords a snug bearing for the stabilizer rod and eliminates undesired play, the action being confined to the region between the bearing and the ends of the stabilizer bar.

In the rear stabilizer, as shown in Figs. 14 and 15, the flexing ends 72 of the bar are received under an overhanging plate 73 bolted on a U-strap 74 carried on the rear axle 75. The anchorage for the rod, shown at 76, is similar to that employed on the front stabilizer, but is part of a bracket 77 bolted to a structural element 78 of the rear bogie frame.

Transfer of stabilizing action

As seen in Figs. 3 to 7, the plates 53 overlap the front end of the rear bogie, being positioned a small distance above and below the centering members 49. Thus, in normal rocking of the trailer, the two bogies continue to act independently of each other in the matter of rocking about a longitudinal axis, pitching and turning. However, during abnormal rocking, it is not only desirable that the independent bogies be restrained from too great a departure in their action, but also to enlist the damping action of the extra stabilizers. The plates 53, therefore, are so positioned that at an undesirable amplitude of rocking of the front bogie relative to the rear, the rocking is picked up at one or more of the plates 53 by one or more of the members 49 and the rear bogie tends to partake of the rocking movement in phase. If the rear bogie happens to be in a state of equilibrium or out of phase with the front bogie as to rocking, the first result will be that it will lend its inertia to check the same. In all cases, however, the rear bogie will contribute to the damping action through the medium of its stabilizer.

In the reverse sense, the front stabilizer will not contribute greatly to damp rocking in the rear bogie, since the reaction between elements 49 and plates 53 is resisted by the entire inertia of the trailer. While such resistance is more or less abrupt, it nevertheless is valuable as a delimiting means for rocking of the rear bogie.

While the transfer of stabilizing effect has been shown in a particular preferred form as pairs of plates in a particular region of the bogie assemblage, it will be understood that the transfer means can take other forms and positions and performs an important function in the limitation of relative rocking between dual bogies even in the absence of stabilizer means. I therefore do not desire that any part of my invention shall be limited except as shall appear from the spirit and scope of the appended claims.

What is claimed is:

1. In a vehicle of the type having a dual set of bogies loosely connected whereby the wheels of one may follow irregularities of terrain independently of the other within substantial limits, and said bogies having dual fulcrum means whereby the rear bogie is swung about a center offset from the axis of the vehicle in following a turn thereof, the improvement comprising a stabilizer on one of the bogies, a stabilizer on the other bogie and elements on one of the bogies above and below said fulcrum means and positioned for contact by the said fulcrum means to transmit sway from one bogie to the other at a predetermined amplitude of sway of the said one bogie, whereby stabilizing action is transmitted from one bogie to the other.

2. The combination of claim 1, said coacting means comprising plates rigidly attached to the front bogie and spaced vertically of said fulcrum means.

3. In a vehicle of the type having a dual set of tandem bogies universally connected whereby the wheels of one may follow irregularities of terrain independently of the other within substantial limits, the improvement comprising a stabilizer on one bogie, a stabilizer on the other bogie, one of said bogies having extensions lying respectively above and below the other of said bogies in overlapping relation but spaced therefrom, whereby the bogies may contact at a predetermined amplitude of relative rocking thereof about longitudinal axes of the bogies, to transmit stabilizing action from one bogie to the other.

4. In a vehicle of the type having a dual set of tandem bogies universally connected whereby the wheels of one may follow irregularities of terrain independently of the other within substantial limits, the improvement comprising a stabilizer on one bogie, a stabilizer on the other bogie, and means rigidly secured to one of the bogies and extending in horizontal planes above and below the other bogie, in overlapping relation therewith, and spaced therefrom, so that said means lie in the path of rocking of adjacent portions of the other bogie, whereby the bogies may contact at a predetermined amplitude of relative rocking thereof about longitudinal axes of the bogies, to transmit a lost-motion stabilizing action from one bogie to the other.

5. In a vehicle of the type having a front bogie and a rear bogie universally connected whereby the wheels of one may follow irregularities of terrain independently of the other within substantial limits, said front bogie having a stabilizer, and the entire bogie system being supported through the front bogie from a single trunnion on the vehicle, the improvement comprising a stabilizer on the rear bogie, and an element rigidly attached to the front bogie and extending in horizontal planes in overlapping relation to a portion of the rear bogie above and below said portion whereby the bogies may contact at a predetermined amplitude of relative rocking thereof about longitudinal axes of the bogies, to transmit stabilizing action from one bogie to the other.

GEORGE D. HARRAH.

REFERENCES CITED

The following references are of record in the file of this patent:

UNITED STATES PATENTS

| Number | Name | Date |
| --- | --- | --- |
| 2,460,429 | Oyler | Feb. 1, 1949 |